Figure 1:
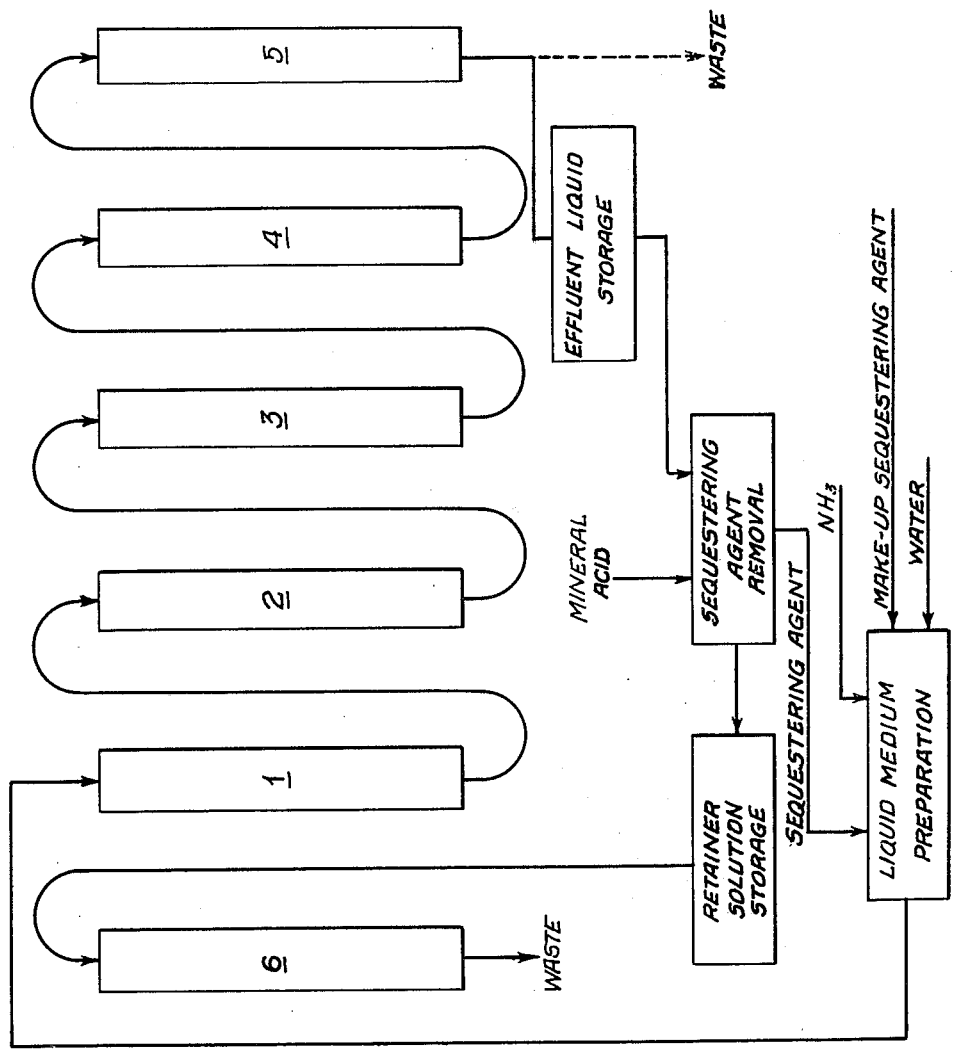

Jan. 26, 1965             M. M. WOYSKI             3,167,389

ION EXCHANGE PROCESS FOR SEPARATING THE RARE EARTHS

Filed May 15, 1962                                              3 Sheets-Sheet 1

INVENTOR.
Mark M. Woyski,
BY
Cromwell, Greist + Warden
Attys.

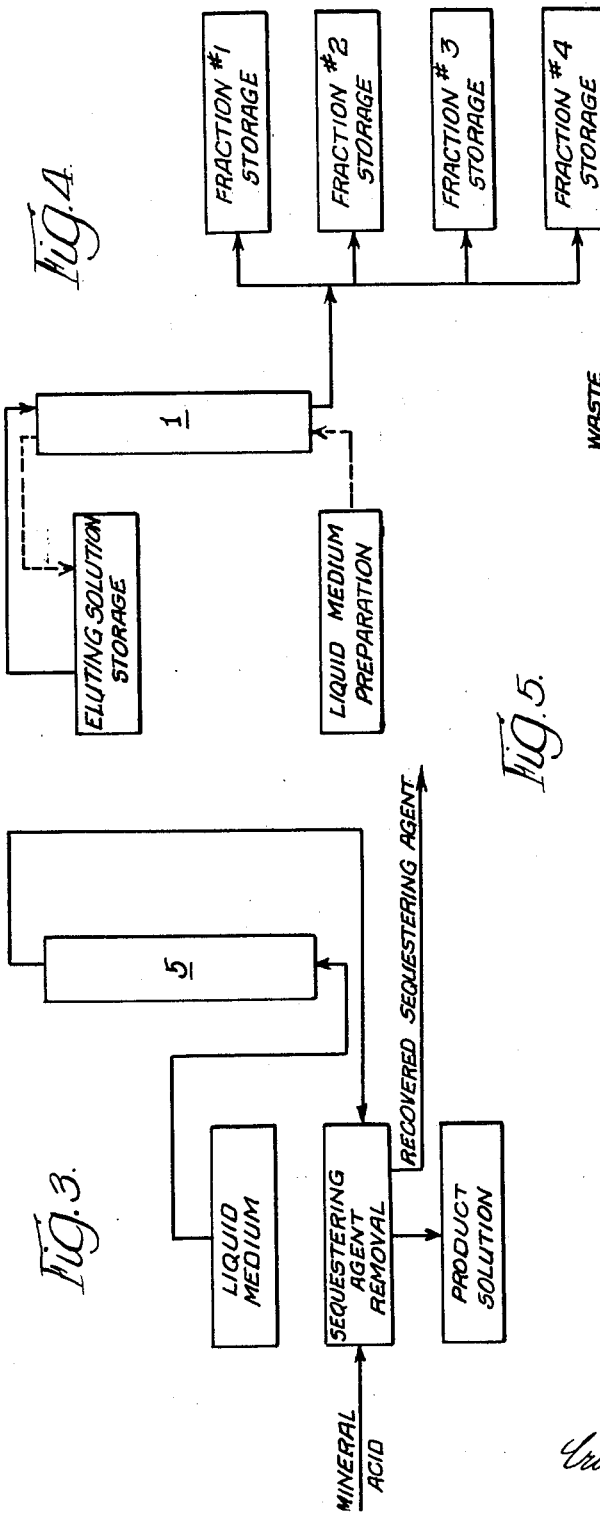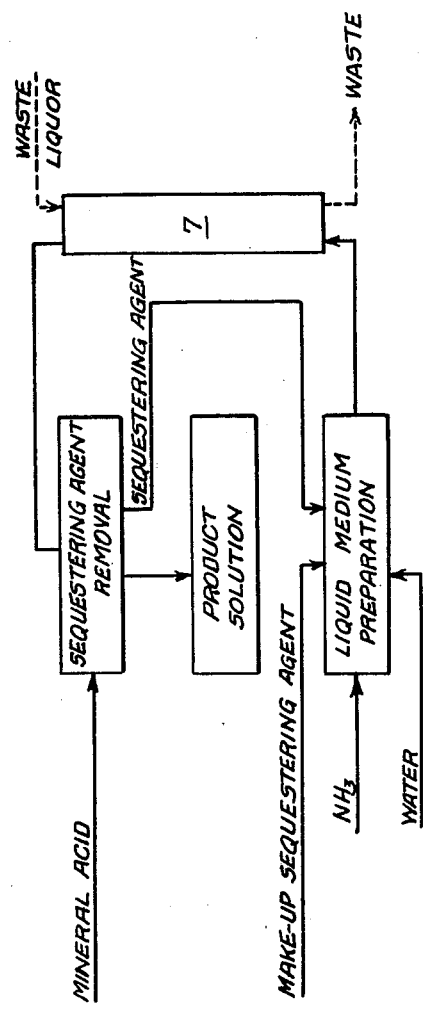

United States Patent Office 3,167,389
Patented Jan. 26, 1965

3,167,389
ION EXCHANGE PROCESS FOR SEPARATING THE RARE EARTHS
Mark M. Woyski, West Chicago, Ill., assignor to American Potash & Chemical Corporation, Los Angeles, Calif., a corporation of Delaware
Filed May 15, 1962, Ser. No. 198,394
7 Claims. (Cl. 23—19)

The present invention relates to a new and improved method of separation and purification of mixtures of rare earths which may include yttrium. More specifically, the invention is directed to a method of continuously separating and purifying mixtures of rare earths and yttrium by ion exchange to an extent that a desired product is obtained.

This application is a continuation-in-part of my copending application Serial No. 829,416 which was filed on Jul 24, 1959, and assigned to the same assignee as the present application.

It is an object of the present invention to provide a new and improved method of separating and purifying mixtures of rare earths and yttrium by which method all of the various rare earths and yttrium may be separated and purified on a commercial basis and to a high degree of purity.

A further object is to provide a new and improved method of the type described which is adapted for continuous operation including as a part thereof recovery of the eluting or sequestering agent for continuous reuse thereof, the method utilizing to advantage the selective ion exchange characteristics of rare earths and yttrium and avoiding the formation of insoluble complex compounds to a degree which would normally constitute a hindrance in the efficient continuous operation of an ion exchange system.

Still a further object is to provide a new and improved method of separating rare earths and yttrium from mixtures thereof by ion exchange, the method utilizing a new ion retainer principle which permits efficient recovery and reuse of the sequestering agent, the ion retainer principle being of a nature for adaptation and utilization in a continuously operating ion exchange system, the operation of which may be varied and controlled at will to obtain the desired degree of ion separation and purification as well as selective ion separation and purification.

A further object taken in conjunction with the foregoing objects is to utilize in the ion exchange method referred to a unique ion exchange liquid medium or eluting solution which may be continuously prepared and reused without interruption in continuous operation of the basic ion separation and purification system.

An additional object of the present invention is to provide a new and improved method of recovering rare earth and yttrium ions from a waste liquor, this method utilizing certain principles of the ion separation and purification method referred to above with the recovery of the sequestering agent of the ion exchanged liquid medium for continuous reuse thereof.

Figure 2:
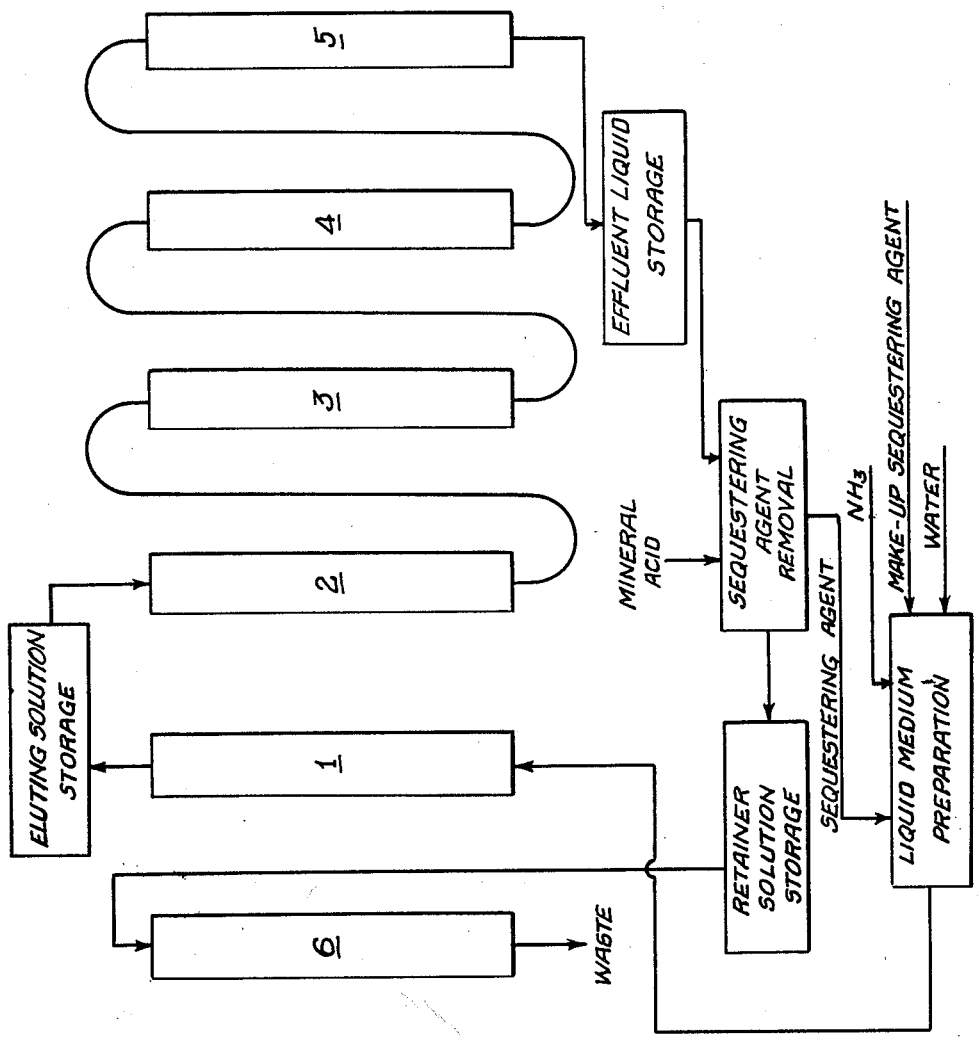

Other objects not specifically set forth will become apparent from the following detailed description of the present invention made in conjunction with the drawings wherein:

FIG. 1 diagrammatically illustrates in flow sheet form a known ion exchange system which has been modified to operate in accordance with the principles of the present invention;

FIG. 2 diagrammatically illustrates in flow sheet form an operational modification of the system of FIG. 1;

FIG. 3 diagrammatically illustrates in flow sheet form product recovery by ion exchange which forms a part of the present invention;

FIG. 4 diagrammatically illustrates in flow sheet form a fractional ion exchange method which makes use of certain of the principles of the present invention; and FIG. 5 diagrammatically illustrates in flow sheet form waste liquor ion exchange treatment which forms a part of the present invention.

The method of the present invention includes several variable concepts of operating an ion exchange system in obtaining separation and purification of rare earth mixtures which generally include yttrium. In its preferred form, the method includes ion exchange between a bed of cation exchange resin (such as Amberlite IR–120, Rohm and Haas sulfonated polystyrene resin) and a solution of the ammonium salt of ethylenediaminetetraacetic acid or solutions of other suitable sequestering agents of the type which exhibit slight solubility in their acid form.

Heretofore, rare earth separation and purification was obtained through fractional crystallization of various rare earth salts, primarily double nitrates. This method is quite laborious and with the exception of its use in separating and purifying lanthanum and neodymium, is commercially prohibitive in cost. Accordingly, other rare earths have not been commercially available except in very small quantities of mixtures. In this respect, one additional exception is in the case of cerium which has been subject to ready separation due to the fact that its valence can be changed.

In an effort to improve upon the known fractional crystallization procedures, an ion exchange process was developed initially for use in rare earth determinations relating to fission research in the atomic energy field and subsequently for use in separating and purifying rare earths on a commercial basis. In developing this procedure, it was found that a cation resin is a preferred repository for rare earths and that suitable selective exchange of ions can be obtained with a solution of the ammonium salt of ethylenediaminetetraacetic acid. In describing this method, reference is made to FIG. 1 which illustrates a series of columns 1–5 containing therein ion exchange solid medium in the form of beds of cation exchange resin. By way of example, columns 1–3 would be loaded with a rare earth mixture undergoing separation and columns 4 and 5 would be loaded with copper ions. A solution of the ammonium salt of ethylenediaminetetraacetic acid would flow through columns 1–5 with the initial pH of the solution being adjusted to about 8.2. As the stability of the eluting solution with the rare earth ions increases slowly and progressively with the atomic number of the rare earths, the rare earths exchanged from the resin by the solution is richer in the heavier rare earths than the original mixture. Accordingly, a degree of separation takes place during flow of the eluting solution through columns 1–3. When the solution carrying selected rare earths reaches the copper containing columns 4 and 5, an ion exchange reaction occurs whereby the rare earths in solution are deposited on the resin as displaced by copper ions and a copper complex solution is formed. As illustrated in broken lines in FIG. 1, the copper complex solution is discarded as the copper complex cannot be readily broken to recover the sequestering agent for subsequent reuse. As the flow of eluting agent through the columns 1–5 is continued, the rare earth mixture therein moves progressively through the columns accompanied by progressively greater separation and purification until each of the rare earths is present in a more or less distinct zone on the resin. At this point the heaviest rare earth elements are at the head of the distinct bands or zones and the lightest elements constitute the tail zones. The method is made continuous by continually loading the tail columns with copper following movement of the rare earths bands therefrom into the next successive columns. This method provided the first workable ion exchange system for rare earth separation and purification but was found to be generally uneconomical and inefficient for commercial application due to several major limitations.

The presence of the copper complex in the eluting agent (when formed from ethylenediaminetetraacetic acid at concentrations above 0.4%) as used in the earlier ion exchange method described above created the problem of copper complex precipitation in the resin columns with continuing precipitation upon continuous operation of the system resulting in increasing concentrations to an extent that ion exchange operation was hindered. On a commercial cost basis, the substantial waste of exhausted eluting agent, including the copper complex, was virtually prohibitive, also, the use of copper presented a serious waste disposal problem. Furthermore, it was found that the heaviest rare earth ions were retained to an undesirable extent in the exhausted eluting solution as their affinity was almost equal to that of copper. As there is no known economically feasible method for breaking the copper complex formed in order to recover the sequestering agent for reuse, the cost of continuously using fresh sequestering agent added materially to the cost of the final product.

As a material improvement over the copper cycle ion exchange method described above, it has been found that rare earths and yttrium can be used as their own retainer with the use of copper ions eliminated and that the rare earths and yttrium retainer ions can be recovered by absorption on resin and continuously reused as retainer. With this discovery, it has also been found that the sequestering agent can be recovered for continuous reuse by precipitation thereof from the effluent eluate by the addition thereto of a mineral acid. The purpose of the rare earth retainer band in the method of the present invention is solely to maintain the band length of the rare earths being purified by removing the rare earths absorbed in the eluting solution by an exchange of the eluting agent ions with those selected to constitute the retainer. Recognition of advantageous use of the variable stability of the eluting agent with rare earths of varying atomic numbers makes this particular method possible.

FIG. 1 also illustrates the operation of an ion exchange system wherein selected rare earths are used as a rare earth separation and purification retainer. All of the columns 1–6 include beds of cation exchange resin with columns 1–4 constituting the repository zones for a rare earth mixture undergoing separation and purification. The ion exchange liquid medium or eluting solution is delivered into the top of column 1 and flows through the successive beds of resinous material in columns 1 through 4. During this flow ion exchange occurs in a preferential sequence which, generally speaking, includes the absorption of the rare earth ions in the eluting solution displacing the ammonium content thereof which combines with the resin. Column 5 constitutes the retainer zone and the resinous bed therein is a repository for selected heavier rare earth elements. By way of example, where it is desired to separate and concentrate the lighter rare earths from lanthanum to terbium, a mixture of rare earths from dysprosium to lutetium may constitute the retainer. As the eluting agent reaches the retainer zone of the cycle, further ion exchange occurs whereby the retainer ions displace from the eluting solution the rare earths absorbed therein. Accordingly, the retainer zone is decreased to an extent adequate to displace the rare earths from the eluting solution with the displacement resulting in the formation of specified bands or zones of separated rare earths of varying purity. As ion exchange continues, the retainer zone is slowly depleted and the deposited bands of separated rare earths increase in purity.

The effluent issuing from the bottom of column 5 constitutes a solution of the sequestering or eluting agent combined with the rare earths of the retainer and is delivered into an effluent liquid storage. In treating the effluent for sequestering agent reuse and retainer ions reuse, the effluent is first subjected to sequestering agent removal by mineral acid treatment resulting in sequestering agent precipitation. The precipitated sequestering agent in the form of the free acid is introduced into an ion exchange liquid medium preparation zone wherein fresh eluting solution is continuously formed by combining proper quantities of water with recovered and fresh sequestering agent. The liquid medium undergoing preparation is also subjected to ammonia treatment and the resulting eluting solution, upon sequestering agent content and pH adjustment, is continously delivered into column 1. The solution containing the retainer ions is suitably stored and is used to prepare a fresh retainer column 6 for connection into the successive column system upon exhaustion of the initial retainer column 5. In preparing the new retainer column 6, the retainer solution is merely passed therethrough in exchange with the solid medium therein resulting in the absorption of the retainer ions by the resinous material with the effluent from column 6 being passed to waste.

From the foregoing it will be readily appreciated that sequestering agent recovery is made possible by utilization of selected rare earths as a retainer. Furthermore, the recovered sequestering agent as well as the retainer ions are continuously reused thus materially decreasing the cost of operation of the system not only because of reagent recovery, but also because of elimination of waste disposal problems. The waste from the column 6 undergoing preparation as a new retainer column needs little treatment for legal disposal and no costly ingredients which are essential to efficient operation of the system are lost therewith. Upon exhaustion of the initial retainer column 5, the fresh retainer column 6 is ready for connection into the system and it is utilized to replace column 1 from which the original mixture of rare earths undergoing separation and purification has been removed by continuing ion exchange. Column 5 then contains distinct bands of separated rare earths which may be subjected to further purification or removed as final products depending upon the extent to which the system has been operated and the original rare earth mixture has undergone separation and purification.

Assuming that column 5 contains in its entirety a desired final product, FIG. 3 illustrates product removal therefrom. A suitable ion exchange liquid medium (the ammonium salt of ethylenediaminetetraacetic acid) is passed into column 5 in reverse flow direction to fluidize the resin bed therein. This procedure provides for intimate contact between the liquid medium and the solid medium for efficient ion exchange therebetween and complete product removal from the solid medium. The effluent having the product absorbed therein is then subjected to sequestering agent removal accomplished by precipitation thereof as a result of mineral acid addition. The precipitated sequestering agent is recovered for subsequent use and the resulting solution constitutes the product solution. The rare earths of the product solution may be precipitated therefrom by treating the solution with oxalic acid with the rare earths being recovered as oxalates.

To further improve on the separation and purification method illustrated in FIG. 1, it was considered desirable to increase the concentration of the sequestering agent in the ion exchange liquid medium and thereby increase the overall capacity of the system. However, as is true of the earlier copper cycle method, an acid complex of rare earths and sequestering agent has a tendency to form in the liquid medium, this complex having a very low solubility and upon increase in concentration in the liquid medium the complex tends to precipitate out of the liquid medium onto the solid medium thereby fouling the same and reducing the efficiency of ion exchange in the continuously operating system. Upon increasing the concentration of sequestering agent in the liquid medium it has been found that the acid complex precipitates out of the medium to a greater extent. In order to eliminate this problem and permit the use of increased concentrations of sequestering agent, it has been found that by pre-treating or pre-conditioning the liquid medium prior to use thereof by forming therein a complex rare earth salt, the formation of the acid complex is held at a minimum and the concentration of sequestering agent in the liquid medium can be substantially increased.

In general, the improved eluting solution is prepared by first forming a solution of the ammonium salt of ethylene-diaminetetraacetic acid and passing the same in reverse flow direction through a resinous bed the resin of which having absorbed thereon selected rare earth elements. The reverse flow of the solution through the resinous bed results in the bed being fluidized with adequate turbulence being created to prevent segregation of reaction products. Chemically, the eluting solution prepared in this manner includes therein the neutral salt of a rare earth complex which is freely soluble. The creation of turbulence during the preparation of the eluting agent further provides for controlling the amount of slightly soluble rare earth acid complex formed to maintain the concentration thereof in the eluting agent well below the solubility limit thereof.

While the eluting agent containing the rare earth complex salt can be prepared in any suitable manner, such as by using a completely separate resinous bed on which is loaded the selected rare earth elements, this feature can be incorporated in a continuously operating system to make use of one of the columns therein in which ion exchange has already occurred. Continuous operation of the type described is illustrated in FIG. 2. For purpose of description it will be assumed that ion exchange had continued for some time through columns 1–5 in the order described above with respect to FIG. 1. The original rare earth mixture undergoing separation has moved forward to define in these columns various areas or zones of partial separation and purification. When the system is initially placed into operation with the eluting solution passing into column 1, this solution has been prepared by any suitable means to include therein the rare earth complex salt described above. The rare earths used for this purpose will be the lighter rare earths having atomic numbers no higher than the lowest atomic numbers of the rare earths to be separated and purified.

Following continued operation of the system, the rare earths retained in column 1 will be those displaced from the eluting solution and column 1 can eventually be removed from the system for use in regenerating the eluting solution as shown in FIG. 2. In this respect, the effluent issuing from the bottom of the retainer column 5 is passed into a storage zone and then introduced into a treating zone wherein the sequestering agent is removed by mineral acid treatment. As previously described in FIG. 1, the retainer solution following sequestering agent removal is collected and continuously used to prepare column 6 as a new retainer column for subsequent replacement of column 5 in the system. The precipitated sequestering agent is reused in the ion exchange liquid medium preparation zone and the fresh liquid medium is passed through column 1 in reverse flow direction to fluidize the resin bed therein. Column 1 is thus stripped of the rare earth ions absorbed therein to form in the liquid medium the rare earth complex salts. The completed eluting solution is then passed into a storage zone from which it is continuously delivered into column 2, etc., to provide for continuous operation of the ion exchange system.

As previously described, the rare earth ions deposited in the tail column, which will vary as any one of the columns 1 through 6 as the system operates continuously over a substantial period of time, are the ions which are initially used and continuously reused in forming the rare earth complex salt in the eluting solution. Thus, these particular ions as well as the ions forming the retainer of the system are continuously reused. Preferably, excess ammonia will be used in preparing the liquid medium for stripping column 1 in FIG. 2. During the fluidizing of the resin therein to form a homogeneous mixture with the liquid medium, any appreciable formation of the acid complex is prevented by neutralization by basic ammonium hydroxide released during the reaction. In this respect, neutralization of the eluting solution is maintained and the concentration of sequestering agent used therein may be increased appreciably without acid complex precipitation during subsequent ion exchange use of the eluting solution. By way of example, the earlier copper cycle system was limited in operation to use of eluant concentrations of about 0.4% or at most 0.8%. By forming the rare earth complex salt in accordance with the principles of the present invention, the eluant concentration may be increased to as great as 10% or even somewhat above this percentage. Preferably the liquid medium including the rare earth complex salt as prepared by backwashing column 1 in FIG. 2 will be subjected to pH adjustment prior to introduction into column 2 to adjust the pH at about 3.5, or within the range of from about 2.5 to 4.5.

The following are illustrative examples of the ion exchange method of the present invention and should not be construed as limiting thereto:

EXAMPLE I

Eight columns numbered 1 through 8 and containing beds of cation exchange resin (Amberlite IR–120) were placed in series operation. Each of the columns was six inches in diameter and six feet high and contained five feet of resin bed. The volume of resin in each bed was about one cubic foot.

Two columns were loaded with purified lanthanum by passing 80 gallons of lanthanum chloride solution containing 20 grams of lanthanum oxide per liter through them. Excess solution was removed by washing with water. Eluting solution was prepared by circulating by reverse flow a solution of ethylenediaminetetraacetic acid and ammonia, adjusted so that the molecular ratio of the acid to ammonia was 1:4, and in which the concentration of the acid was 26 grams per liter, until a slight excess of the sequestering agent was present. The solution was reserved in the eluting solution storage tank. The columns were washed out.

The first two columns Nos. 1 and 2, serving as retainer, were loaded with a mixture of rare earths consisting of approximately 80% yttrium, 10% dysprosium and small amounts of gadolinium, terbium, holmium, and other heavy elements, but being virtually free of lighter elements. It must be noted in this connection that yttrium behaves in this operation as a rare earth positioned between terbium and dysprosium. To effect this loading, five kilograms of the oxide mixture were dissolved in a small excess of hydrochloric acid, diluted to a concentration of 20 grams of oxide per liter. After adjusting the pH to 3.0, the solution was pumped through the columns and excess removed by washing with water.

The rare earth mixture to be purified consisted of praseodymium oxide, 50%; neodymium oxide, 25%; samarium oxide, 10%; and small amounts of gadolinium, cerium and lanthanum. Twenty kilograms of this mixture was dissolved in hydrochloric acid and loaded on the remaining six columns, Nos. 3 through 8, in a manner analogous to that used in preparing the retainer columns Nos. 1 and 2.

The eluting solution was now introduced and flowed successively through the six columns Nos. 3 through 8 undergoing purification and then through the two retainer columns Nos. 1 and 2. Ion exchange occurred over a period of 48 hours, during which time the rare earth band moved forward one column. The mixture undergoing purification was displaced from the tail column No. 3 and moved into the second column No. 4 with the resinous bed in the tail column No. 3, having absorbed therein, the rare earth ions of the eluting solution. The retainer ions in the lead column No. 2 were simultaneously displaced and collected in the effluent storage tank.

The sequestering agent was now recovered from the liquid effluent by adding mineral acid, adjusting to a pH of 1 filtrating and washing. The solution containing retainer ions was reserved. Liquid medium was made up with the recovered sequestering agent and the same was passed through the tail column No. 3, reverse flow, to regenerate a new supply of eluting solution. The tail column No. 3, after being washed free of rare earths was reloaded with the solution of retainer ions previously recovered and reserved and was then connected in the series at the head of the band. In this way, the elution proceeded uninterruptedly and the rare earth band moved forward one column every 48 hours. During each 48-hour interval, the tail column was treated for eluting solution regeneration and was reloaded with retainer ions and connected in series to form the new head of the band.

Separation and purification continued for twenty days, at which time columns Nos. 3, 4, and 6 contained, therein, the final products praseodyminum and neodymium. The columns containing these products were disconnected from the system and a fresh source of ion exchange liquid medium containing 5% of ethylenediaminetetraacetic acid was passed in reverse flow therethrough to strip the same in the manner described in connection with FIG. 3 above. The product ions were removed from the product solution following sequestering agent precipitation therefrom, by the addition of oxalic acid and after ignition to the oxide, the products had the following analyses:

*Praseodymium oxide*

| | Percent |
|---|---|
| $Pr_6O_{11}$ | 99.9+ |
| $Nd_2O_3$ | Less than 0.1 |
| $CeO_2$ | Less than 0.1 |

*Neodymium oxide*

| | |
|---|---|
| $Nd_2O_3$ | 99.9+ |
| $Pr_6O_{11}$ | Less than 0.1 |
| $Sm_2O_3$ | Less than 0.1 |

It will be appreciated by one skilled in the art that by direct elution from the columns further quantities of praseodymium and neodymium of varying purity may be obtained and that after this operation is completed, the depleted columns can be reloaded with new mixtures for purification without disturbing the other columns in the system and the elution again continued in the manner described.

The method of the present invention can be utilized in separating and purifying all of the various rare earths as controlled by appropriate selection of the retainer ions and eluting solution ions. As previously described, the eluting solution ions have an effective atomic number no higher than the lowest effective atomic number of the ions to be separated and purified; the retainer ions have an atomic number at least as high as the highest atomic number of any of the ions to be separated and purified. In this respect, it will be appreciated that the extreme ions of the series may require slight variations in the method for purification and recover thereof. Thus it may be necessary to recover the product from the effluent eluant following the mineral acid treatment described in FIG. 3. It will be understood that on a commercial basis it may be desired to separate certain specified ions as distinguished from separating and purifying all of the various rare earth constituents of a given mixture. Accordingly, certain selected rare earths may be separated and purified to the exclusion of other rare earths occurring in the mixture. Furthermore, yttrium occurs in natural rare earth mixtures although yttrium is not a member of the rare earth series. Generally speaking, in the order of rare earth ion separation, yttrium occurs between terbium and dysprosium. The following is an example of yttrium separation and purification:

EXAMPLE II

The purification of yttrium was carried out by using the fractions of Example III below. The operating system was identical with that of Example I. Two retainer columns were loaded with Fraction I of Example III. Six columns to be purified were loaded with Fraction II. Fraction III was used as the eluting solution. After the band had moved 14 columns in about 36 days the retainer cycle was discontinued and product solution collected by continuing the elution. Five fifty-gallon fractions, each corresponding to the product, from one column were thus collected. The product ions were removed from the product solution following sequestering agent precipitation therefrom, by the addition of oxalic acid. After ignition to the oxide, the products had the following analyses:

*Fraction I*

| | Percent |
|---|---|
| $Y_2O_3$ | 99.9 |
| $Dy_2O_3$ | About 0.1 |

*Fractions II, III, and IV*

| | |
|---|---|
| $Y_2O_3$ | 99.9 |
| $Dy_2O_3$ | Less than 0.1 |
| $Tb_4O_7$ | Less than 0.1 |

*Fraction V*

| | |
|---|---|
| $Y_2O_3$ | 99.9 |
| $Tb_4O_7$ | About 0.1 |

FIG. 4 illustrates a system wherein partial separation and concentration of various rare earth elements can be obtained without the use of a retainer. In this system a single column 1 of resin is loaded with a suitable mixture of rare earths. A suitable eluting solution containing therein a selected rare earth complex salt is passed through the column in ion exchange with the resin and the effluent is subdivided into Fractions 1–4 with suitable storage zones for each of these fractions. Upon completion of the partial separation and concentration, freshly prepared liquid medium may be passed through column 1 in reverse stripping flow to remove the rare earth elements initially used in forming the complex salt for reuse thereof in partial separation and concentration of a new rare earth mixture. The following is an example of this particular procedure:

EXAMPLE III

A single column of 6 inches in diameter and 10 feet in height filled with cation exchange resin was loaded with a mixture having the following analysis:

| | Percent |
|---|---|
| Yttrium | 50 |
| Gadolinium | 10 |
| Samarium | 10 |
| Neodymium | 15 |
| Dysprosium plus heavier elements | 15 |

An eluting solution containing the complex salt of lanthanum, praseodymium and cerium at a concnetration of 5% was passed through the column at a rate of 200 ml. per minute. The fractions collected had the following analyses:

*Fraction I*

| | Percent |
|---|---|
| Heavies (Dy, Er, Ho, Tm, Yb, Lu) | 50 |
| Yttrium | 50 |

*Fraction II*

| | |
|---|---|
| Yttrium | 85 |

*Fraction III*

| | |
|---|---|
| Gadolinium and samarium | 80 |

Fraction IV

Neodymium ------------------------------- 85

FIG. 5 illustrates waste liquor treatment. An ion exchange column 7 containing the resinous medium therein has passed therethrough a suitable waste liquor having rare earths therein. The rare earths of the waste liquor are absorbed on the resin and after a capacity load is obtained a suitable liquid medium ion exchange solution is passed through the column in reverse flow to strip the same. As illustrated in FIG. 5, the liquid medium following stripping is subjected to mineral acid treatment to precipitate therefrom the sequestering agent which is reused in liquid medium preparation for subsequent operations. In this procedure there is no separation or purification of the rare earth elements removed from the column, the purpose being merely to recover rare earth elements from waste liquor. Obviously, the rare earth mixture recovered may then be separated along the lines previously described. The recovery procedure outlined in FIG. 5 may be used advantageously to process waste containing as little as 1 gram per liter or less of rare earth elements.

Actually, under certain circumstances a crude rare earth mixture can function as its own retainer. This is true in the instance where the crude mixture contains a high content of one or more of the rare earth elements. Mixtures containing high contents of yttrium are rather common and if there is a very low content of rare earths immediately adjacent yttrium in the series, the yttrium can be separated from the mixture without the use of a separate retainer. Non-retainer separation is particularly useful where partial separation is desired such as described in connection with FIG. 4 above.

The eluting solution has been described above as containing rare earth complex salts, but it is also possible to make use of alkaline earth metal ions in place of rare earth ions in the complex salt. Suitable metal ions are: calcium, barium and magnesium. Where these salts are used, the system is obtained in exactly the same manner as previously described and recovery and use of the metal ions is the same. Although in the process as described, the ammonium salts of ethylenediaminetetraacetic acid and ammonium salts of the rare earth complexes have been specified, it is always possible to replace the bulk of the ammonium ions with an alkali metal ion; namely, lithium, sodium, potassium, rubidium, or cesium. However, it is preferred practice to retain a nominal amount of ammonium ion in the salts as better pH control is obtained. Thus, the eluting solution may be defined as comprising an aqueous solution containing ethylenediaminetetraacetic anions.

The retainer ions may consist of a pure rare earth or yttrium or mixtures thereof. The recovery of the sequestering agent by mineral acid addition may be carried out by adjusting the effluent solution by addition of a suitable mineral acid to a pH of 1. The precipitated sequestering agent is removed by filtration. Preferably, a strong mineral acid is used such as nitric, hydrochloric or sulfuric. With the method of the present invention permitting use of higher concentrations of sequestering agent, the method of recovery and reuse thereof is greatly simplified. It has been found that as high as 90% to 95% of the sequestering agent can be recovered for reuse.

While multiple column operation has been described, it will be appreciated that single column operation is possible. In using a single column, the retainer ions may be transferred into the column in such a manner that a retainer bed of appropriate depth is formed at the bottom of the column. The resin loaded with the mixture to be purified is loaded in the column to form a uniform bed on the top of the retainer resin zone. Elution then proceeds in the normal manner as described above and the eluant solution is collected as fractions containing pure elements and cross contamination bands. The cross contamination bands may be used in forming the rare earth complex salts in the eluting solution with this procedure eliminating the necessity of separate handling of the cross contamination bands and also permitting the buildup of band lengths of the less abundant elements so that higher purity is obtained.

While the use of a sulfonated polystyrene cation exchange resin such as Amberlite IR-120 is preferred, any other suitable cation exchange resins may be used. By way of example, phenolic methylene sulfonic type resins and the nuclear sulfonic type resins may be used. A specific resin is a hydrocarbon-polymer-type cation exchange resin containing nuclear sulfonic acid groups prepared in accordance with the method described in U.S. Patent No. 2,366,007.

Obviously certain modifications and variations of the invention as hereinbefore set forth may be made without departing from the spirit and scope thereof, and therefore only such limitations should be imposed as are indicated in the appended claims

I claim:

1. In an ion exchange system for separating and purifying rare earth and yttrium product ions from mixtures thereof, said system including a plurality of operatively interconnecting zones arranged for selective isolation successively of at least one of said zones from the others without interruption of ion exchange and separation in said other zones and in which each of the zones contains a bed of solid cation exchange medium, the improvement which comprises:

(1) establishing a number of successive separation zones by loading the solid beds in said zones with quantities of a solution containing a mixture of the ions which are to be separated and purified, said ions being selected from the group consisting of rare earth and yttrium ions, (2) establishing the next successive zone as a retainer zone by loading the solid bed therein with quantities of a solution containing a mixture of retainer ions selected from the group consisting of rare earth and yttrium ions, the retainer ions having an effective atomic number at least as high as the highest effective atomic number of the ions in the mixture loaded in said separation zones, (3) establishing ion exchange eluting solution sequestering agent comprising an aqueous solution containing a rare earth complex of ethylenediamine tetraacetate anions, the ions in said ion exchange eluting solution having an effective atomic number no higher than the lowest effective atomic number of the ions in the mixture loaded in said separation zones and the solution having a pH ranging from about 2.5 to 4.5, (4) passing said eluting solution successively through said separation zones whereby the eluting solution absorbs the ions originally loaded into the separation zones with a consequent displacement of the rare earth ion content of the eluting solution into the solid beds in the separation zones, (5) passing the resultant modified eluting solution through the retainer zone to effect therein an ion exchange in which the retainer ions displace the ions previously absorbed by the eluting solution with the latter ions becoming associated with the solid bed in the retainer zone, and (6) continuously acidifying the liquid medium effluent exiting from the retainer zone to separate an aqueous solution of the retainer ions from the sequestering agent, (7) passing the separated sequestering agent to an eluting solution preparation and supply zone for recycle through said separation zone, and (8) separating the desired separated and purified rare earth and yttrium product ions from association with the solid bed and recovering the same by ion exchange with eluting solution from said preparation and supply zone.

2. The method of claim 1 wherein the sequestering agent is present in the eluting solution at concentrations of as high as about 10%.

3. In an ion exchange system for separating and purifying rare earth and yttrium product ions from mixtures thereof, said system including a plurality of operatively interconnected zones arranged for selective isolation successively of at least one of said zones from the others without interruption of ion exchange and separation in said other zones and in which each of the zones contains a bed of solid cation exchange medium, the improvement which comprises:

(1) establishing a number of successive separation zones by loading the solid beds in said zones with quantities of a solution containing a mixture of the ions which are to be separated and purified, said ions being selected from the group consisting of rare earth and yttrium ions, (2) establishing the next successive zone as a retainer zone by loading the solid bed therein with a mixture of retainer ions selected from the group consisting of rare earth and yttrium ions, the retainer ions having an effective atomic number at least as high as the highest effective atomic number of the ions in the mixture loaded in said separation zones, (3) establishing an ion exchange eluting solution sequestering agent comprising an aqueous solution containing a rare earth complex of ethylenediamine tetraacetate anions, the anions in said ion exchange eluting solution having an effective atomic number no higher than the lowest effective atomic number of the ions in the mixture loaded in said separation zones and the solution having a pH ranging from about 2.5 to 4.5, (4) passing said eluting solution successively through said separation zones whereby the eluting solution absorbs the ions originally loaded into the separation zones with a consequent displacement of the rare earth ion content of the eluting solution into the solid beds in the separation zones, (5) passing the resultant modified eluting solution through the retainer zone to effect therein an ion exchange in which the retainer ions displace the ions previously absorbed in the eluting solution with the latter ions becoming associated with the solid bed in the retainer zone, (6) continuously acidifying the liquid medium effluent exiting from the retainer zone to separate an aqueous solution of the retainer ions from the sequestering agent, (7) passing the separated sequestering agent to an eluting solution preparation and supply zone for recycle through said separation zones, (8) disconnecting the first separation zone without interrupting the delivery of liquid to the remaining zones, (9) loading the bed of said disconnected zone with the retainer ions separated in (6) to form a new retainer zone for reconnection with the separation zones to provide for continuous operation of said system, and

(10) recovering product ions by reverse stripping of a disconnected separation zone by use of the ion exchange eluting solution from said preparation and supply zone followed by precipitation of the sequestering agent therefrom, resulting in a product ion solution.

4. The method of claim 3 wherein said ion exchange eluting solution is prepared for re-use in the system by introducing the liquid medium leaving said preparation and supply zone in (6) into said disconnected first separation zone prior to preparation of said first separation zone as a new retainer zone, said introduction occurring in reverse flow direction to fluidize the bed therein and strip the same of selected separated ions adequate to form the rare earth complex and prevent the formation of an insoluble acid complex in said eluting solution during subsequent ion exchange therewith to an extent to cause precipitation of said complex in said separation and retainer zones, and thereafter passing said conditioned ion exchange eluting solution into the remaining separation zones.

5. The method of claim 3 wherein the sequestering agent is present in the ion exchange eluting solution at concentrations of as great as about 10%.

6. In the method of separating and concentrating rare earths and yttrium from mixtures thereof which comprises: loading a solution cation exchange medium with a solution containing a mixture to be separated and concentrated, passing a liquid ion exchange medium sequestering agent comprising an aqueous solution containing a rare earth complex of ethylene diamine tetraacetate anions through said solution medium, said liquid medium including therein selected ions having an effective atomic number no higher than the lowest effective atomic number of the rare earth and yttrium ions to be separated and concentrated for preferential ion exchange with said ion-loaded solid medium, separating the resulting effluent into sequestering agent and liquid fractions of concentrated ion containing portions thereof, and separating the ion concentrates therefrom, the improvement which comprises continuously regenerating said ion exchange liquid medium by passing the complex-free sequestering agent recovered from said effluent in reverse flow through said solid medium.

7. In an ion exchange system for separating and purifying rare earth and yttrium product ions from mixtures thereof, said system including a plurality of operatively interconnected beds of solid cation exchange resin arranged for selective isolation of at least one of said beds from the others without interruption of ion exchange in said other beds, the improvement which comprises:

(1) establishing at least one of said beds as a separation zone by loading the resin therein with quantities of a solution containing a mixture of the ions which are to be separated and purified, said ions being selected from the group consisting of rare earth and yttrium ions, (2) establishing the next successive bed as a retainer zone by loading the resin therein with quantities of a solution containing a mixture of retainer ions selected from the group consisting of rare earth and yttrium ions, the retainer ions having an effective atomic number at least as high as the highest effective atomic number of the ions in the mixture loaded in said separation zone, (3) establishing an ion exchange eluting solution sequestering agent comprising an aqueous solution of the ammonium salt of ethylenediamine tetraacetic acid, said solution having a pH ranging from about 2.5 to 4.5, (4) passing said eluting solution through said separation zone whereby the eluting solution absorbs the ions originally loaded into the separation zones with a consequent deposition of the ammonium ion of the eluting solution onto the resin in the separation zone, (5) passing the resultant modified eluting solution through the retainer zone to effect therein an ion exchange in which the retainer ions displace the ions previously absorbed by the eluting solution in the separation zone with the latter ions becoming associated with the solid bed in the retainer zone, (6) continuously treating the liquid effluent exiting from the retainer zone with mineral acid to separate the sequestering agent from the aqueous solution of retainer ions, (7) passing the thus separated sequestering agent through an ion exchange liquid medium preparation zone, (8) disconnecting the first bed in the separation zone without interrupting the delivery of eluting solution to the remaining beds, (9) passing the liquid medium leaving the preparation zone in (7) in reverse flow through said disconnected first bed to regenerate ion exchange eluting solution, thereafter,

(10) passing the aqueous solution of retainer ions obtained in (6) in reverse flow through said disconnected first bed to load the resin therein with said ions and establish a new retainer zone bed, the aqueous effluent being discarded, and

(11) recovering the desired product ions from the first retainer zone by passing an ion exchange liquid medium comprising the ammonium salt of ethylenediamine tetraacetic acid in reverse flow therethrough, and treating the liquid effluent exiting therefrom with mineral acid to separate the sequestering agent and leave a solution of the desired product ions.

References Cited in the file of this patent
UNITED STATES PATENTS

| | | |
|---|---|---|
| 2,539,282 | Speeding et al. | Jan. 23, 1951 |
| 2,694,681 | Bray et al. | Nov. 16, 1954 |
| 2,798,789 | Speeding et al. | July 9, 1957 |